(12) United States Patent  
Wang

(10) Patent No.: US 7,814,794 B2
(45) Date of Patent: Oct. 19, 2010

(54) MICROMACHINED SENSORS

(75) Inventor: Chuan Wei Wang, Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 439 days.

(21) Appl. No.: 11/851,903

(22) Filed: Sep. 7, 2007

(65) Prior Publication Data

US 2009/0064784 A1    Mar. 12, 2009

(51) Int. Cl.
*G01P 15/125* (2006.01)
(52) U.S. Cl. .................................... 73/514.32; 361/280
(58) Field of Classification Search ............ 73/514.32; 361/280
See application file for complete search history.

(56) References Cited

U.S. PATENT DOCUMENTS

| 5,847,280 | A | 12/1998 | Sherman et al. |
| 6,070,464 | A * | 6/2000 | Koury et al. ............. 73/514.32 |
| 6,199,874 | B1 | 3/2001 | Galvin et al. |
| 6,458,615 | B1 | 10/2002 | Fedder et al. |
| 7,000,473 | B2 | 2/2006 | Vandemeer et al. |
| 7,069,784 | B1 | 7/2006 | Eskridge |
| 7,078,916 | B2 | 7/2006 | Denison |
| 7,096,732 | B2 * | 8/2006 | Katsumata et al. ....... 73/514.32 |
| 7,412,888 | B2 * | 8/2008 | Chu et al. ................ 73/514.32 |

* cited by examiner

*Primary Examiner*—John E Chapman

(57) ABSTRACT

The present invention provides a micromachined sensor. The micromachined sensor includes a proof mass movable with respect to a substrate. The proof mass includes a first portion, a second portion separated from the first portion and a third portion connecting the first portion to the second portion. A frame is positioned on the substrate and encloses the proof mass. A plurality of springs connects the proof mass to the frame. A plurality of first and second electrodes extends from the frame. A plurality of third electrodes extends from the first portion of the proof mass and is interleaved with the first electrodes. A plurality of fourth electrodes extends from the second portion of the proof mass and is interleaved with the second electrodes. A first support beam extends from the frame to the area between the first and second portions of the proof mass. A plurality of seventh and eighth electrodes extends from the first support beam. A plurality of fifth electrodes extends from the first portion of the proof mass and is interleaved with the seventh electrodes. A plurality of sixth electrodes extends from the second portion of the proof mass and is interleaved with the eighth electrodes.

14 Claims, 4 Drawing Sheets

MICROMACHINED SENSORS

BACKGROUND OF THE INVENTION

1. Field of the Invention

The invention relates to a micromachined device, and more particularly, to a capacitor-based micromachined sensor.

2. Description of the Related Art

Microfabrication, also known as micromachining, commonly refers to the use of known semiconductor processing techniques to fabricate devices known as micro-electromechanical systems (MEMS) or micromachined devices. In general, known MEMS fabrication processes involve the sequential addition and removal of layers of material from a substrate layer through the use of film deposition and etching techniques until the desired structure has been realized. Accordingly, MEMS devices typically function under the same principles as their macroscale counterparts. MEMS devices, however, offer advantages in design, performance, and cost in comparison to their macroscale counterparts due to the decrease in scale of MEMS devices. In addition, due to batch fabrication techniques applicable to MEMS technology, significant reductions in per unit cost may be realized.

Micromachined structures are frequently used in MEMS inertial sensors, such as accelerometers and gyroscopes. A MEMS accelerometer using differential capacitors to detect acceleration typically includes three primary micromachined elements: a central, or proof mass, capacitor plates, and springs. FIG. 1 is a top plan view of a typical prior differential capacitor-based micromachined accelerometer 100, including a movable proof mass 102 supported by spring support beams 104. The proof mass 102 includes a plurality of electrodes 108 extending perpendicularly away from the proof mass 102, which are interleaved with a plurality of electrodes 110 extending perpendicularly from support beams 112. These features are formed in a cavity 116 formed in a substrate 118 through conventional etching techniques, and may be anchored to the underlying substrate 118 or cantilevered structures released from the substrate 118. The electrodes 108 and 110 are typically made of polysilicon or a material comprised of multi-films, such as silicon dioxide or aluminum, thereby creating individual parallel-plate capacitors between each adjacent pair of the interleaved electrodes 108, 110. In operation, when the accelerometer 100 is accelerated, the electrodes 108 move relative to the electrodes 110, thereby varying the distance, and hence the capacitance, between the electrodes 108, 110. The variable capacitance can be determined by peripheral circuitry interfacing with connectors 120, which are connected to the electrodes 110 via the support beams 112.

The sensitivity of such prior micromachined accelerometers 100 is dependent upon a number of factors, including the mass of the proof mass 102, spring 104 and capacitance between the electrodes 108, 110. Generally, the greater the mass of the proof mass 102 is, the better the inertial sensing device is because for a given acceleration, there will be a greater force. Thus, additional mass could be added by enlarging the proof mass 102, thus increasing the tendency of the proof mass 102 to remain motionless relative to the other components of the accelerometer 100. However, because typical prior micro-accelerometers require peripheral circuitry, there is a practical limit to the available size of the proof mass 102 given a particular die size. Besides, the greater the total capacitance between the electrodes 108, 110 is, the better the sensitivity of the accelerometer 100 is. The total capacitance between the electrodes 108, 110 is proportional to the total overlapping area between the electrodes 108, 110. An approach to increasing the total overlapping area between the electrodes 108, 110 is to increase the number of the electrodes 108, 110. However, the increase in the number of the electrodes 108, 110 typically needs an appropriate increase in the lateral sides for the proof mass 102 in order to accommodate more electrodes 108, 110. As described above, there is a practical limit to the available size of the proof mass 102 given a particular die size.

Accordingly, there exists a need to provide a micromachined sensor to solve the above-mentioned problems.

SUMMARY OF THE INVENTION

It is an object of the present invention to provide a micromachined sensor that has better sensitivity than a conventional one by increasing the number of electrodes.

In order to achieve the above object, the micromachined sensor according to the first embodiment of the present invention includes a proof mass movable with respect to a substrate. The proof mass includes a first portion, a second portion separated from the first portion and a third portion connecting the first portion to the second portion. A frame is disposed on the substrate and encloses the proof mass. A plurality of springs connects the proof mass to the frame. A plurality of first and second electrodes extends from the frame. A plurality of third electrodes extends from the first portion of the proof mass and is interleaved with the first electrodes. A plurality of fourth electrodes extends from the second portion of the proof mass and is interleaved with the second electrodes. A first support beam extends from the frame to the area between the first and second portions of the proof mass. A plurality of seventh and eighth electrodes extends from the first support beam. A plurality of fifth electrodes extends from the first portion of the proof mass and is interleaved with the seventh electrodes. A plurality of sixth electrodes extends from the second portion of the proof mass and is interleaved with the eighth electrodes.

The micromachined sensor according to the second embodiment of the present invention further includes a second support beam extending from the frame to the area between the first and second portions of the proof mass, wherein the first and second support beams are in alignment with each other and separated by the third portion of the proof mass. A plurality of ninth electrodes extends from the second support beam and is interleaved with the fifth electrodes. A plurality of tenth electrodes extends from the second support beam and is interleaved with the sixth electrodes.

The micromachined sensor according to the third embodiment of the present invention includes a proof mass movable with respect to a substrate. The proof mass includes a first portion, a second portion, a third portion separated from the first and second portions, a fourth portion connecting the first portion to the third portion and a fifth portion connecting the second portion to the third portion. A frame is disposed on the substrate and encloses the proof mass. A plurality of springs connects the proof mass to the frame. A plurality of first and twelfth electrodes extends from the frame. A plurality of second electrodes extends from the first portion of the proof mass and is interleaved with the first electrodes. A plurality of eleventh electrodes extends from the second portion of the proof mass and is interleaved with the twelfth electrodes. A plurality of third electrodes extends from the first portion of the proof mass. A plurality of tenth electrodes extends from the second portion of the proof mass. A plurality of sixth electrodes extends from the third portion of the proof mass. A plurality of seventh electrodes extends from the third portion of the proof mass. A first support beam extends from the frame to the area between the first and third portions of the proof mass. A second support beam extends from the frame to the area between the second and third portions of the proof mass. A plurality of fourth electrodes extends from the first support beam and is interleaved with the third electrodes. A plurality of fifth electrodes extends from the first support beam and is interleaved with the sixth electrodes. A plurality of eighth electrodes extends from the second support beam and is interleaved with the seventh electrodes. A plurality of ninth electrodes extends from the second support beam and is interleaved with the tenth electrodes. A third support beam extends from the frame to the area between the first and third portions of the proof mass, wherein the first and third support beams are in alignment with each other and separated by the fourth portion of the proof mass. A fourth support beam extends from the frame to the area between the second and third portions of the proof mass, wherein the second and fourth support beams are in alignment with each other and separated by the fifth portion of the proof mass. A plurality of thirteenth electrodes extends from the third support beam and is interleaved with the third electrodes. A plurality of fourteenth electrodes extends from the third support beam and is interleaved with the sixth electrodes. A plurality of fifteenth electrodes extends from the fourth support beam and is interleaved with the seventh electrodes. A plurality of sixteenth electrodes extends from the fourth support beam and is interleaved with the tenth electrodes.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
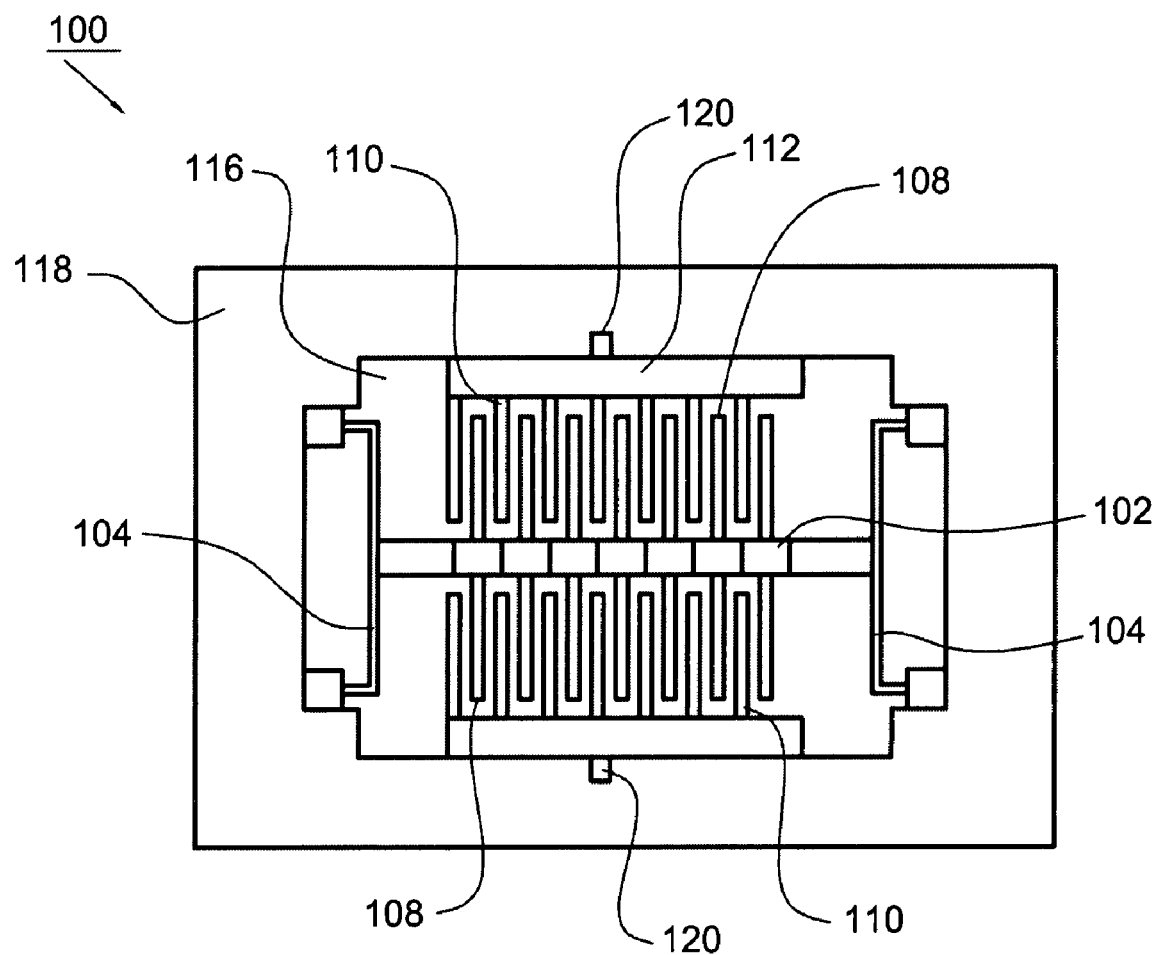
FIG. 1 is a top plan view of a typical prior differential capacitor-based micromachined accelerometer
Figure 2:
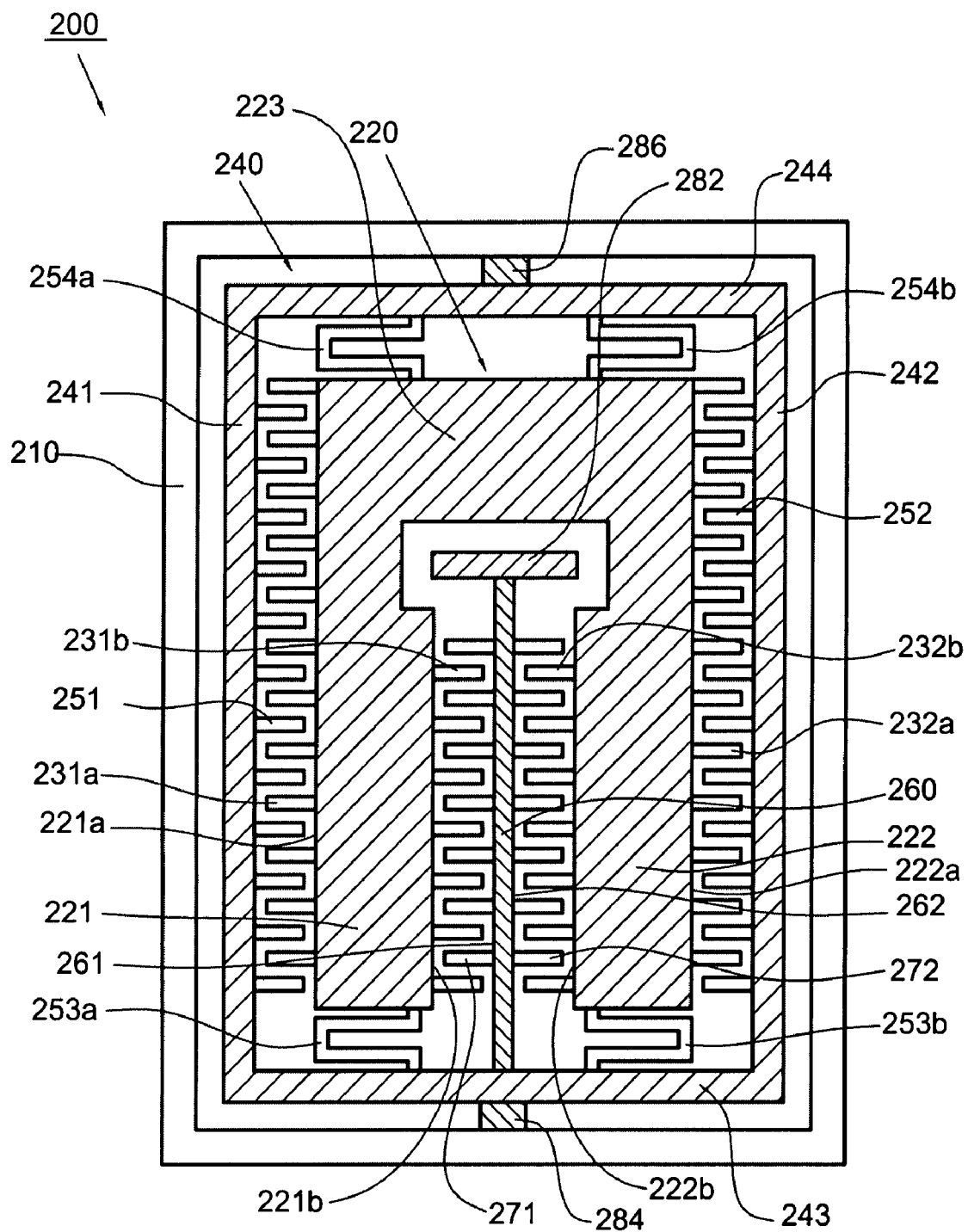
FIG. 2 is a top plan view of a micromachined sensor according to the first embodiment of the present invention.

Referring to FIG. 2, a micromachined sensor 200 according to the first embodiment of the present invention includes a proof mass 220 movable with respect to a substrate 210. The proof mass 220 includes a first portion 221, a second portion 222 separated from the first portion 221 and a third portion 223 connecting the first portion 221 to the second portion 222. A plurality of electrodes 231a extends perpendicularly away from one longitudinal side 221a of the first portion 221. Likewise, a plurality of electrodes 232a extends perpendicularly away from one longitudinal side 222a of the second portion 222. A frame 240 with two longitudinal sides 241, 242 and two transverse sides 243, 244 is positioned on the substrate 210 and encloses the proof mass 220. An anchor 284 is connected to the transverse side 243 of the frame 240 and is rigidly coupled to the substrate 210. An anchor 286 is connected to the transverse side 244 of the frame 240 and is rigidly coupled to the substrate 210. A plurality of electrodes 251 extends perpendicularly away from the longitudinal side 241 of the frame 240 and is interleaved with the electrodes 231a. A plurality of electrodes 252 extends perpendicularly away from the longitudinal side 242 of the frame 240 and is interleaved with the electrodes 232a. A spring 253a connects the first portion 221 of the proof mass 220 to the transverse side 243 of the frame 240 and a spring 253b connects the second portion 222 of the proof mass 220 to the transverse side 243 of the frame 240. Springs 254a and 254b connect the third portion 223 of the proof mass 220 to the transverse side 244 of the frame 240.

In order to enhance the sensitivity of the micromachined sensor 200, a support beam 260 extends perpendicularly from the transverse side 243 of the frame 240 to the area between the first portion 221 and the second portion 222. An anchor 282 is rigidly coupled to the substrate 210. The end of the longitudinal sides 261, 262 of the support beam 260 is connected to the anchor 282. A plurality of electrodes 271 extends perpendicularly away from one longitudinal side 261 of the support beam 260 and is interleaved with a plurality of electrodes 231b which extend perpendicularly away from the other longitudinal side 221b of the first portion 221. A plurality of electrodes 272 extends perpendicular away from the other longitudinal side 262 of the support beam 260 and is interleaved with a plurality of electrodes 232b which extend perpendicularly away from the other longitudinal side 222b of the second portion 222. In operation, when the micromachined sensor 200 is accelerated, the electrodes 231a, 231b, 232a and 232b will move relative to the electrodes 251, 271, 252 and 272 respectively, thereby varying the distance, and hence the capacitance between the electrodes 231a, 231b, 232a, 232b and the electrodes 251, 271, 252, 272 respectively. A signal of variation of the capacitance between the electrode pairs 231b and 271, and the electrode pairs 232b and 272 can be sent out to external circuitry via the circuitry deployed in the support beam 260 (not shown). The variation of the capacitance between those electrodes and their respective counter electrodes can be used to determine the acceleration of the micromachined sensor 200. Since the total capacitance increase due to the introduction of the electrode pairs 231b, 271 and the electrode pairs 232b, 272 to the micromachined sensor 200, the sensitivity of the micromachined sensor 200 is thus better in comparison to the conventional micromachined sensor 100.

It is to be noted that higher residual stress will be present in the frame 240 when the micromachined sensor 200 is formed in CMOS processes and thus the frame 240 is more prone to warpage. Such warpage can cause electrodes not to match with their counter electrodes. This will reduce the sensitivity of the sensor 200. To avoid such adverse effect on the sensor 200, the anchors 282, 284 and 286 are preferable in alignment with each other when the micromachined sensor 200 is formed in CMOS or other processes.

Figure 3:
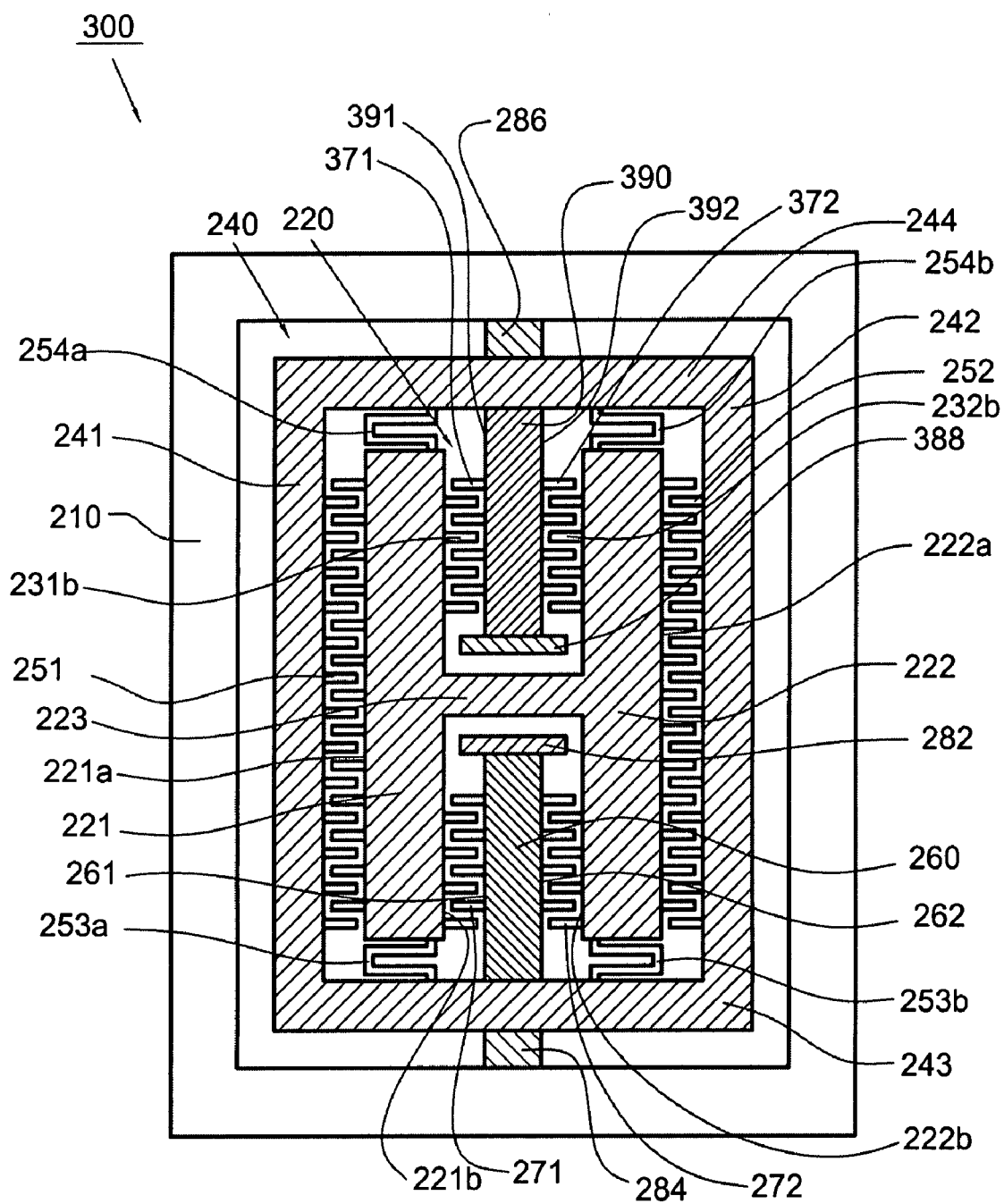
FIG. 3 is a top plan view of a micromachined sensor according to the second embodiment of the present invention.

Referring to FIG. 3, a micromachined sensor 300 according to the second embodiment of the present invention is shown, where identical reference numbers have been used when designating substantially identical elements that are common to the figures. Thus, any further illustrations of the identical elements are omitted herein. The micromachined sensor 300 is substantially identical to the micromachined sensor 200 and the differences between them are in that the proof mass 220 of the sensor 300 is substantially H-shaped. The third portion 223 of the proof mass 220 in the sensor 300 is substantially connected to the middle of the longitudinal side 221b of the first portion 221 and that of the longitudinal side 222b of the second portion 222. The springs 254a and 254b connect the first portion 221 and second portion 222 of the proof mass 220 respectively to the transverse side 244 of the frame 240. The sensor 300 further includes a support beam 390 which extends perpendicularly from the transverse side 244 of the frame 240 to the area between the first portion 221 and the second portion 222. An anchor 388 is rigidly coupled to the substrate 210. The end of the longitudinal sides 391, 392 of the support beam 390 is connected to the anchor 388. The two support beams 260 and 390 are in alignment with each other and separated by the third portion 223 of the proof mass 220. A plurality of electrodes 371 extends perpendicularly away from one longitudinal side 391 of the support beam 390 and is interleaved with the electrodes 231b which extend from the longitudinal side 221b of the first portion 221. A plurality of electrodes 372 extends perpendicularly away from the other longitudinal side 392 of the support beam 390 and is interleaved with the electrodes 232b which extend from the longitudinal side 222b of the second portion 222. Similarly, when the micromachined sensor 300 is accelerated, the electrodes 371 and 372 will move relative to the electrodes 231b and 232b. The capacitance between the electrodes 371, 372 and their counter electrodes 231b, 232b will change accordingly. A signal of variation of the capacitance between the electrode pairs 231b, 371 and the electrode pairs 232b, 372 can be sent out to external circuitry via the circuitry deployed in the support beam 390 (not shown). The variation of the capacitance between those electrodes and their respective counter electrodes can be used to determine the acceleration of the micromachined sensor 300. Likewise, to avoid the adverse effect on the sensor 300 as described above, the anchor 388 is preferable in alignment with the anchors 282, 284 and 286 when the sensor 300 is formed in CMOS or other processes.

Figure 4:
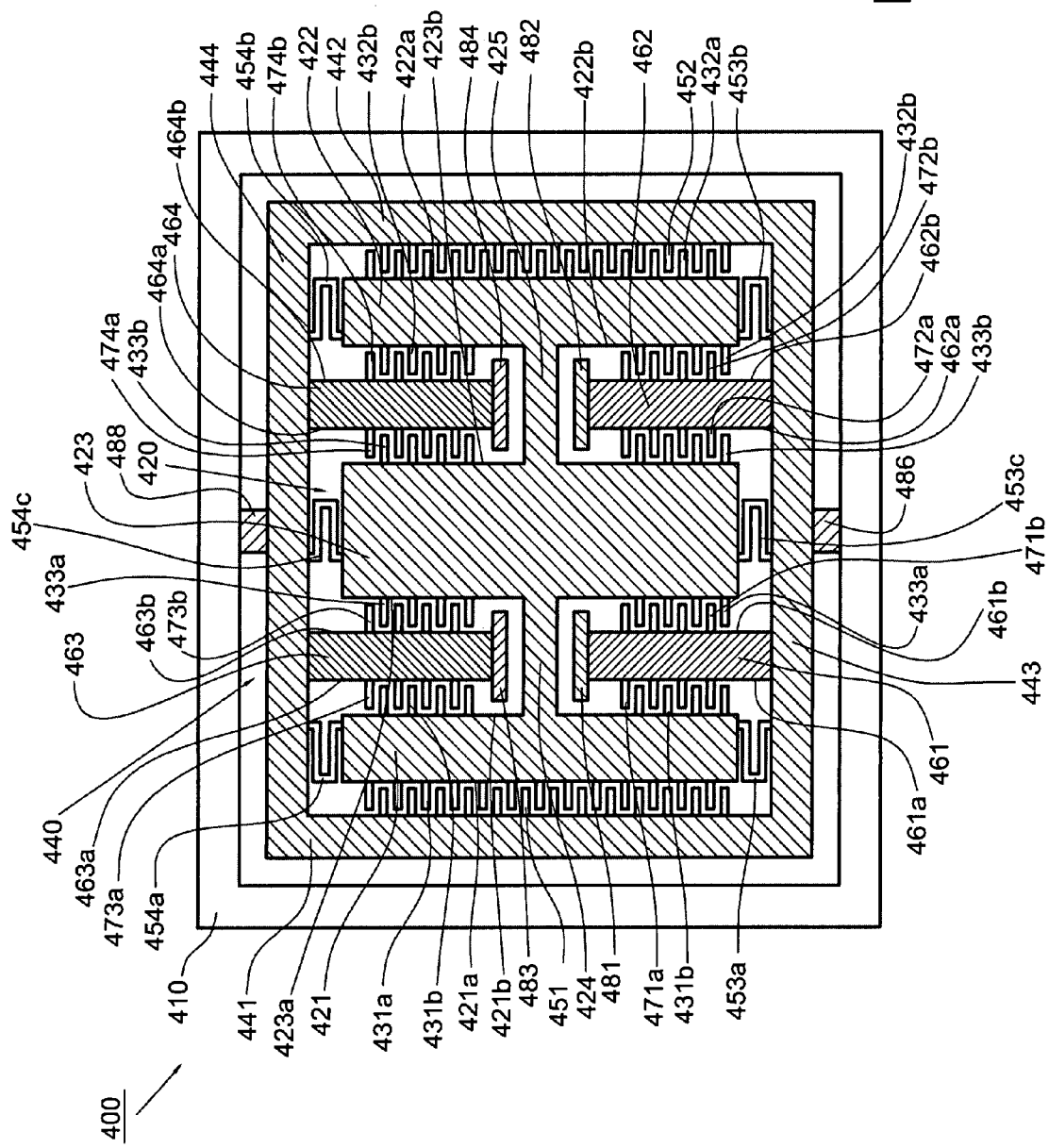
FIG. 4 is a top plan view of a micromachined sensor according to the third embodiment of the present invention.

Referring to FIG. 4, a micromachined sensor 400 according to the third embodiment of the present invention includes a proof mass 420 movable with respect to a substrate 410. The proof mass 420 includes a first portion 421, a second portion 422, a third portion 423 separated from the first and second portions 421, 422, a fourth portion 424 connecting the first portion 421 to the third portion 423 and a fifth portion 425 connecting the second portion 422 to the third portion 423. A plurality of electrodes 431a extends perpendicularly away from one longitudinal side 421a of the first portion 421. A plurality of electrodes 431b extends perpendicularly away from the other longitudinal side 421b of the first portion 421. A plurality of electrodes 432a extends perpendicularly away from one longitudinal side 422a of the second portion 422. A plurality of electrodes 432b extends perpendicularly away from the other longitudinal side 422b of the second portion 422. A plurality of electrodes 433a extends perpendicularly away from one longitudinal side 423a of the third portion 423 and a plurality of electrodes 433b extends perpendicularly away from the other longitudinal side 423b of the third portion 423. A frame 440 with two longitudinal sides 441, 442 and two transverse sides 443, 444 is disposed on the substrate 410 and encloses the proof mass 420. An anchor 486 is connected to the transverse side 443 of the frame 440 and is rigidly coupled to the substrate 410. An anchor 488 is connected to the transverse side 444 of the frame 440 and is rigidly coupled to the substrate 410. A plurality of electrodes 451 extends perpendicularly away from the longitudinal side 441 of the frame 440 and is interleaved with the electrodes 431a. A plurality of electrodes 452 extends perpendicularly away from the longitudinal side 442 of the frame 440 and is interleaved with the electrodes 432a. Springs 453a, 453b and 453c connect the first portion 421, second portion 422 and third portion 423 of the proof mass 420 respectively to the transverse side 443 of the frame 440 and springs 454a, 454b and 454c connect the first portion 421, second portion 422 and third portion 423 of the proof mass 420 respectively to the transverse side 444 of the frame 440.

In order to enhance the sensitivity of the micromachined sensor 400, a support beam 461 extends perpendicularly from the transverse side 443 of the frame 440 to the area between the first portion 421 and the third portion 423. An anchor 481 is rigidly coupled to the substrate 410 and is connected to the end of the longitudinal sides 461a, 461b of the support beam 461. A plurality of electrodes 471a extends perpendicularly away from the side 461a of the support beam 461 and is interleaved with the electrodes 431b. A plurality of electrodes 471b extends perpendicularly away from the side 461b of the support beam 461 and is interleaved with the electrodes 433a. A support beam 462 extends perpendicularly from the transverse side 443 of the frame 440 to the area between the second portion 422 and the third portion 423. An anchor 482 is rigidly coupled to the substrate 410 and is connected to the end of the longitudinal sides 462a, 462b of the support beam 462. A plurality of electrodes 472a extends perpendicularly away from the side 462a of the support beam 462 and is interleaved with the electrodes 433b. A plurality of electrodes 472b extends perpendicularly away from the side 462b of the support beam 462 and is interleaved with the electrodes 432b. A support beam 463 extends perpendicularly from the transverse side 444 of the frame 440 to the area between the first portion 421 and the third portion 423. The support beams 461 and 463 are in alignment with each other and separated by the fourth portion 424 of the proof mass 420. An anchor 483 is rigidly coupled to the substrate 410 and is connected to the end of the longitudinal sides 463a, 463b of the support beam 463. A plurality of electrodes 473a extends perpendicularly away from the side 463a of the support beam 463 and is interleaved with the electrodes 431b. A plurality of electrodes 473b extends perpendicularly away from the side 463b of the support beam 463 and is interleaved with the electrodes 433a. A support beam 464 extends perpendicularly from the transverse side 444 of the frame 440 to the area between the second portion 422 and the third portion 423. The support beams 462 and 464 are in alignment with each other and separated by the fifth portion 425 of the proof mass 420. An anchor 484 is rigidly coupled to the substrate 410 and is connected to the end of the longitudinal sides 464a, 464b of the support beam 464. A plurality of electrodes 474a extends perpendicularly away from the side 464a of the support beam 464 and is interleaved with the electrodes 433b. A plurality of electrodes 474b extends perpendicularly away from the side 464b of the support beam 464 and is interleaved with the electrodes 432b. Similarly, when the micromachined sensor 400 is accelerated, the electrodes 431a, 431b, 433a, 433b, 432a and 432b will move relative to their respective counter electrodes. The capacitance between the electrodes 431a, 431b, 433a, 433b, 432a, 432b and their respective counter electrodes will change accordingly. The circuitry deployed in the support beams 461, 462, 463 and 464 (not shown) can send the signals of variation of the capacitance between those electrodes and their respective counter electrodes out to external circuitry so that the acceleration of the sensor 400 can be determined according to these signals.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A micromachined sensor, comprising:
   a substrate;
   a proof mass movable with respect to the substrate, the proof mass having a first portion, a second portion separated from the first portion and a third portion connecting the first portion to the second portion;
a frame positioned on the substrate and enclosing the proof mass;
a plurality of springs connecting the proof mass to the frame;
a plurality of first electrodes extending from the frame;
a plurality of second electrodes extending from the frame;
a plurality of third electrodes extending from the first portion of the proof mass and interleaved with the first electrodes;
a plurality of fourth electrodes extending from the second portion of the proof mass and interleaved with the second electrodes;
a first support beam extending from the frame to the area between the first and second portions of the proof mass;
a plurality of seventh electrodes extending from the first support beam;
a plurality of eighth electrodes extending from the first support beam;
a plurality of fifth electrodes extending from the first portion of the proof mass and interleaved with the seventh electrodes; and
a plurality of sixth electrodes extending from the second portion of the proof mass and interleaved with the eighth electrodes.

2. The micromachined sensor as claimed in claim 1, further comprising:
a second support beam extending from the frame to the area between the first and second portions of the proof mass, wherein the first and second support beams are in alignment with each other and separated by the third portion of the proof mass;
a plurality of ninth electrodes extending from the second support beam and interleaved with the fifth electrodes; and
a plurality of tenth electrodes extending from the second support beam and interleaved with the sixth electrodes.

3. The micromachined sensor as claimed in claim 2, wherein the frame has two opposing sides, the micromachined sensor further comprising:
two first anchors connected to the opposing sides of the frame respectively and rigidly coupled to the substrate, wherein the first anchors are in alignment with the first and second support beams.

4. The micromachined sensor as claimed in claim 3, further comprising:
a second anchor connected to the end of the first support beam and rigidly coupled to the substrate; and
a third anchor connected to the end of the second support beam and rigidly coupled to the substrate.

5. The micromachined sensor as claimed in claim 2, further comprising:
a first anchor connected to the end of the first support beam and rigidly coupled to the substrate; and
a second anchor connected to the end of the second support beam and rigidly coupled to the substrate.

6. The micromachined sensor as claimed in claim 1, wherein the frame has two opposing sides, the micromachined sensor further comprising:
two anchors connected to the opposing sides of the frame respectively and rigidly coupled to the substrate, wherein the anchors are in alignment with the first support beam.

7. The micromachined sensor as claimed in claim 1, further comprising:
a first anchor connected to the end of the first support beam and rigidly coupled to the substrate.

8. A micromachined sensor, comprising:
a substrate;
a proof mass movable with respect to the substrate, the proof mass having a first portion, a second portion, a third portion separated from the first and second portions, a fourth portion connecting the first portion to the third portion and a fifth portion connecting the second portion to the third portion;
a frame positioned on the substrate and enclosing the proof mass;
a plurality of springs connecting the proof mass to the frame;
a plurality of first electrodes extending from the frame;
a plurality of twelfth electrodes extending from the frame;
a plurality of second electrodes extending from the first portion of the proof mass and interleaved with the first electrodes;
a plurality of eleventh electrodes extending from the second portion of the proof mass and interleaved with the twelfth electrodes;
a plurality of third electrodes extending from the first portion of the proof mass;
a plurality of tenth electrodes extending from the second portion of the proof mass;
a plurality of sixth electrodes extending from the third portion of the proof mass;
a plurality of seventh electrodes extending from the third portion of the proof mass;
a first support beam extending from the frame to the area between the first and third portions of the proof mass;
a second support beam extending from the frame to the area between the second and third portions of the proof mass;
a plurality of fourth electrodes extending from the first support beam and interleaved with the third electrodes;
a plurality of fifth electrodes extending from the first support beam and interleaved with the sixth electrodes;
a plurality of eighth electrodes extending from the second support beam and interleaved with the seventh electrodes; and
a plurality of ninth electrodes extending from the second support beam and interleaved with the tenth electrodes.

9. The micromachined sensor as claimed in claim 8, further comprising:
a third support beam extending from the frame to the area between the first and third portions of the proof mass, wherein the first and third support beams are in alignment with each other and separated by the fourth portion of the proof mass;
a fourth support beam extending from the frame to the area between the second and third portions of the proof mass, wherein the second and fourth support beams are in alignment with each other and separated by the fifth portion of the proof mass;
a plurality of thirteenth electrodes extending from the third support beam and interleaved with the third electrodes;
a plurality of fourteenth electrodes extending from the third support beam and interleaved with the sixth electrodes;
a plurality of fifteenth electrodes extending from the fourth support beam and interleaved with the seventh electrodes; and
a plurality of sixteenth electrodes extending from the fourth support beam and interleaved with the tenth electrodes.

10. The micromachined sensor as claimed in claim 9, wherein the frame has two opposing sides, the micromachined sensor further comprising:

two first anchors connected to the opposing sides of the frame respectively and rigidly coupled to the substrate, wherein the first anchors are in alignment with the third portion of the proof mass.

11. The micromachined sensor as claimed in claim 10, further comprising:

a second anchor connected to the end of the first support beam and rigidly coupled to the substrate;

a third anchor connected to the end of the second support beam and rigidly coupled to the substrate;

a fourth anchor connected to the end of the third support beam and rigidly coupled to the substrate; and a fifth anchor connected to the end of the fourth support beam and rigidly coupled to the substrate.

12. The micromachined sensor as claimed in claim 9, further comprising:

a first anchor connected to the end of the first support beam and rigidly coupled to the substrate;

a second anchor connected to the end of the second support beam and rigidly coupled to the substrate;

a third anchor connected to the end of the third support beam and rigidly coupled to the substrate; and a fourth anchor connected to the end of the fourth support beam and rigidly coupled to the substrate.

13. The micromachined sensor as claimed in claim 8, wherein the frame has two opposing sides, the micromachined sensor further comprising:

two anchors connected to the opposing sides of the frame respectively and rigidly coupled to the substrate, wherein the fifth anchors are in alignment with the third portion of the proof mass.

14. The micromachined sensor as claimed in claim 8, further comprising:

a first anchor connected to the end of the first support beam and rigidly coupled to the substrate; and a second anchor connected to the end of the second support beam and rigidly coupled to the substrate.

* * * * *